United States Patent
Newbold (10) Patent No.: US 12,280,700 B2
(45) Date of Patent: Apr. 22, 2025

(54) TRAY TABLE TUNING MECHANISM WITH CURVED MATING SURFACE FOR PASSENGER SEAT

(71) Applicant: Safran Seats USA LLC, Gainesville, TX (US)

(72) Inventor: Tyler L. Newbold, Sherman, TX (US)

(73) Assignee: Safran Seats USA LLC, Gainesville, TX (US)

( * ) Notice: Subject to any disclaimer, the term of this patent is extended or adjusted under 35 U.S.C. 154(b) by 352 days.

(21) Appl. No.: 18/071,461

(22) Filed: Nov. 29, 2022

(65) Prior Publication Data

US 2024/0174154 A1    May 30, 2024

(51) Int. Cl.
| | |
|---|---|
| B60N 3/00 | (2006.01) |
| B64D 11/06 | (2006.01) |
| A47C 7/68 | (2006.01) |
| A47C 7/70 | (2006.01) |

(52) U.S. Cl.
CPC .......... B60N 3/002 (2013.01); B64D 11/0638 (2014.12); *A47C 7/68* (2013.01); *A47C 7/70* (2013.01)

(58) Field of Classification Search
CPC ........ B60N 3/001; B60N 3/002; B60N 3/004; B60N 3/005; B60N 3/007; B64D 11/0368; A47C 7/68; A47C 7/70
See application file for complete search history.

(56) References Cited

U.S. PATENT DOCUMENTS

| | | | |
|---|---|---|---|
| 1,731,293 A | 10/1929 | Chapman | |
| 2,687,336 A | 8/1954 | Smith | |
| 3,368,842 A | 2/1968 | Polsky | |
| 3,596,987 A * | 8/1971 | Wilson | B64D 11/0007 |
| | | | 297/163 |
| 3,773,381 A * | 11/1973 | Brennan | B29C 31/004 |
| | | | 108/45 |
| 4,159,071 A * | 6/1979 | Roca | A47C 7/70 |
| | | | 108/42 |
| 4,944,552 A | 7/1990 | Harris | |
| 5,221,070 A | 6/1993 | Heilmer | |

(Continued)

FOREIGN PATENT DOCUMENTS

| | | |
|---|---|---|
| EP | 2930108 A1 | 10/2015 |
| FR | 2914245 A1 | 10/2008 |

(Continued)

OTHER PUBLICATIONS

European Application No. 23205114.4, Extended European Search Report mailed on Apr. 23, 2024, 9 pages.

*Primary Examiner* — Syed A Islam (74) *Attorney, Agent, or Firm* — Kilpatrick Townsend & Stockton LLP (57) ABSTRACT

A tray table tuning mechanism having a mount member; a pivot limiting member coupled to the mount member and having a mating surface defining a groove; a paddle arm deployment member pivotably coupled to the mount member and pivotable relative to the pivot limiting member; and a paddle arm pivotably coupled to the paddle arm deployment member, pivotable between a stowed state and a deployed state, and having at least one stop member; wherein, in the deployed state of the paddle arm, the at least one stop member is positioned within the groove and mates with the mating surface.

17 Claims, 9 Drawing Sheets

(56) References Cited

U.S. PATENT DOCUMENTS

| | | | |
|---|---|---|---|
| 5,511,493 A | 4/1996 | Kanehl, Jr. | |
| 5,547,247 A * | 8/1996 | Dixon | A47C 7/70 |
| | | | 297/145 |
| 5,588,697 A | 12/1996 | Yoshida | |
| 6,220,658 B1 | 4/2001 | Lukawski | |
| 6,224,149 B1 * | 5/2001 | Gevaert | A47C 7/70 |
| | | | 297/162 |
| 6,375,257 B1 | 4/2002 | Wooding | |
| 6,427,957 B1 | 8/2002 | Finneman | |
| 6,520,091 B1 | 2/2003 | Dettmers | |
| 7,726,732 B1 | 6/2010 | Keating | |
| 8,109,566 B2 * | 2/2012 | Koh | A47B 83/02 |
| | | | 297/145 |
| 8,256,835 B2 * | 9/2012 | Brink | A47C 7/70 |
| | | | 297/145 |
| 8,672,400 B2 | 3/2014 | Henderson | |
| 8,985,684 B2 | 3/2015 | Zheng et al. | |
| 9,044,093 B1 | 6/2015 | Pan | |
| 10,172,467 B1 | 1/2019 | Shih | |
| 10,752,181 B2 | 8/2020 | Livingston Viswasam | |
| 11,634,059 B2 * | 4/2023 | Newbold | B60N 3/002 |
| | | | 297/162 |
| 11,660,994 B2 * | 5/2023 | Newbold | B64D 11/0638 |
| | | | 297/161 |
| 11,793,315 B2 * | 10/2023 | Olarte | A47C 7/70 |
| 2003/0188672 A1 | 10/2003 | Parent | |
| 2007/0227407 A1 | 10/2007 | Cartensen | |
| 2008/0073946 A1 | 3/2008 | Maione | |
| 2008/0197678 A1 | 8/2008 | Olarte | |
| 2009/0008969 A1 | 1/2009 | Caturla et al. | |
| 2009/0026812 A1 | 1/2009 | Figueras Mitjans | |
| 2010/0090504 A1 | 4/2010 | Brink | |
| 2010/0243839 A1 | 9/2010 | Westerink | |
| 2010/0319588 A1 | 12/2010 | Hanna | |
| 2011/0067606 A1 | 3/2011 | Sundarrao | |
| 2011/0101740 A1 | 5/2011 | Koh | |
| 2012/0204771 A1 | 8/2012 | Fukuhara | |
| 2012/0306241 A1 | 12/2012 | Winter | |
| 2014/0110977 A1 | 4/2014 | Madrigal | |
| 2014/0300148 A1 | 10/2014 | Frost | |
| 2014/0312669 A1 | 10/2014 | Zheng | |
| 2018/0170549 A1 | 6/2018 | Jussli | |
| 2018/0279790 A1 | 10/2018 | Pozzi | |
| 2018/0339630 A1 | 11/2018 | Akaike | |
| 2019/0351799 A1 | 11/2019 | Kim et al. | |
| 2020/0215950 A1 | 7/2020 | Gomez | |
| 2021/0120961 A1 | 4/2021 | Griepentrog | |
| 2022/0227277 A1 | 7/2022 | Dueker | |
| 2023/0073445 A1 | 3/2023 | Newbold | |

FOREIGN PATENT DOCUMENTS

| | | |
|---|---|---|
| GB | 2598170 A | 2/2022 |
| JP | 2011079436 A | 4/2011 |

* cited by examiner

FIG. 6 ns may be used with various types of seats such as, but not limited to, aircraft seats, vehicle seats, stadium seats, office seats, theater seats, or other similar seats.

TRAY TABLE TUNING MECHANISM WITH CURVED MATING SURFACE FOR PASSENGER SEAT

FIELD OF THE INVENTION

The field of the invention relates to passenger seats, and, more particularly, to tray table assemblies for passenger seats.

BACKGROUND

Passenger vehicles, such as aircraft, buses, trains, ships, and automobiles, often include at least one passenger seat in which passengers may be seated or otherwise use during travel. A passenger seat may include a tray table assembly that may be used for various purposes including deploying for holding food, stowing for allowing passengers or other suitable individuals to move with respect to the passenger seat, and the like. Contemporary mechanisms for deploying or stabilizing tray tables may include springs or other mechanisms that limit the tray table. The springs may wear quickly, which can lead to the tray table rotating beyond an acceptable rotational limit. And the other mechanisms may limit or otherwise prevent the table from sitting at a desirable height or angle with respect to the passenger seat, the passenger, or any other suitable individual using the passenger seat.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, a tray table tuning mechanism includes: a mount member; a pivot limiting member coupled to the mount member and comprising a mating surface defining a groove; a paddle arm deployment member pivotably coupled to the mount member and pivotable relative to the pivot limiting member; and a paddle arm pivotably coupled to the paddle arm deployment member, pivotable between a stowed state and a deployed state, and comprising at least one stop member; wherein, in the deployed state of the paddle arm, the at least one stop member is positioned within the groove and mates with the mating surface.

According to certain embodiments, a method for using a tray table tuning mechanism, the tray table tuning mechanism including a mount member, a pivot limiting member comprising a mating surface defining a groove, a paddle arm deployment member, and a paddle arm, includes: rotating the paddle arm deployment member relative to the mount member; and rotating the paddle arm relative to the paddle arm deployment member to a deployed state; wherein, in the deployed state, at least one stop member extending from the paddle arm is positioned within the groove and mates with the mating surface to limit rotation of the paddle arm deployment member in a first rotation direction.

According to certain embodiments, a passenger seat includes an arm rest; and a tray table tuning mechanism coupled to the arm rest, the tray table tuning mechanism comprising: a mount member; a pivot limiting member coupled to the mount member and comprising a mating surface defining a groove; a paddle arm deployment member pivotably coupled to the mount member and pivotable relative to the pivot limiting member; and a paddle arm pivotably coupled to the paddle arm deployment member, pivotable between a stowed state and a deployed state, and comprising at least one stop member; wherein, in the deployed state of the paddle arm, the at least one stop member is positioned within the groove and mates with the mating surface.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide tray table assemblies having tray table tuning mechanisms for passenger seats. While the tray table assemblies and the tray table tuning mechanisms are discussed for use with aircraft seats, they are by no means so limited. Rather, embodiments of the tray table assemblies and the tray table tuning mechanisms described herein may be used in passenger seats or other seats of any type or otherwise as desired.

Figure 1:
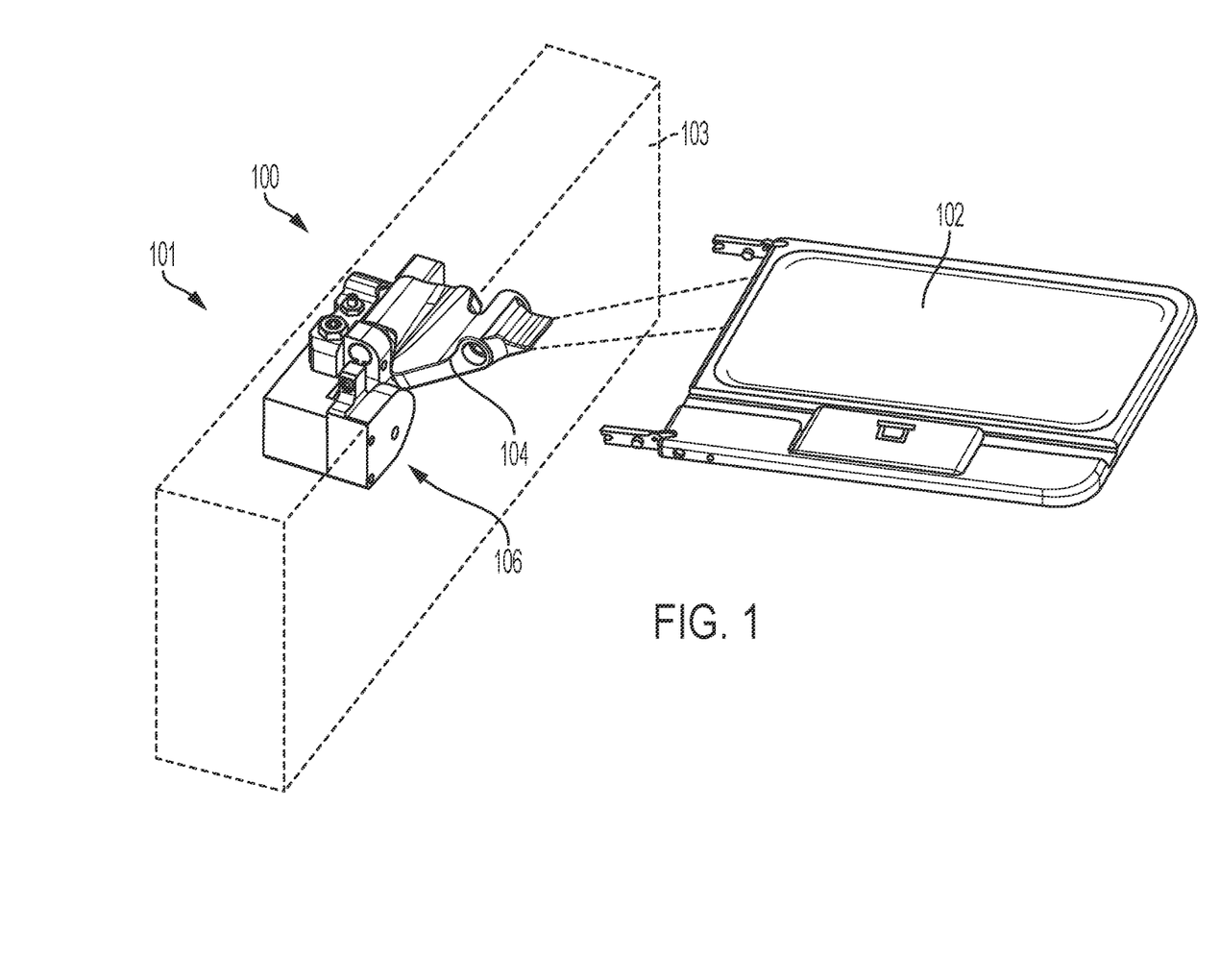
FIG. 1 is a perspective view of a table assembly of a passenger seat according to certain embodiments of the present invention.

FIG. 1 illustrates a partial perspective view of a passenger seat 101 according to certain embodiments of the present invention. The passenger seat 101 may include a subset of parts or components of a passenger seat that may be positioned in a passenger vehicle, such as an aircraft, train, and the like, and that may be used by a passenger or other individual associated with the passenger vehicle. The passenger seat 101 may include a passenger seat arm 103 and a table assembly 100 that may be supported by and/or relative to the passenger seat arm 103.

The table assembly 100 may include a tray table 102, a paddle arm 104, and a tray table tuning mechanism 106. The paddle arm 104 may be mechanically or otherwise suitably coupled to the tray table 102 and to the tray table tuning mechanism 106. In some embodiments, screws, bolts, rivets, or other mechanical or chemical fasteners may couple the paddle arm 104 to the tray table 102, to the tray table tuning mechanism 106, to other suitable components, or to a combination thereof. In other embodiments, the paddle arm 104 may be coupled to the tray table 102 via at least one additional component of the table assembly 100. Additionally, the tray table tuning mechanism 106 may be mechanically or otherwise suitably coupled to the passenger seat arm 103, an armrest, or other suitable type of passenger seat arm of the passenger seat 101. In some embodiments, when stowed, the tray table 102, the paddle arm 104, and the tray table tuning mechanism 106 may be at least partially contained within the passenger seat arm 103.

In some embodiments, the tray table tuning mechanism 106 enables the tray table 102 to be deployed for use such as for holding food or other suitable items associated with the passenger or other individual using the passenger seat. While the tray table 102 is deployed, the tray table tuning mechanism 106 may also enable the tray table 102 to be positioned at a set and/or adjustable height and angle with respect to the passenger seat 101, the passenger, or any other suitable individual using the tray table 102. For example, the tray table tuning mechanism 106 may enable at least one angle with respect to the tray table 102, to the paddle arm 104, or a combination thereof, to be adjusted. Additionally, a usable lifetime of the tray table tuning mechanism 106 may be longer than that of one formed of existing components (e.g., springs, etc.), which may allow the tray table 102 to maintain stability for an increased amount of time and/or usage as compared to other mechanisms.

Figure 4:
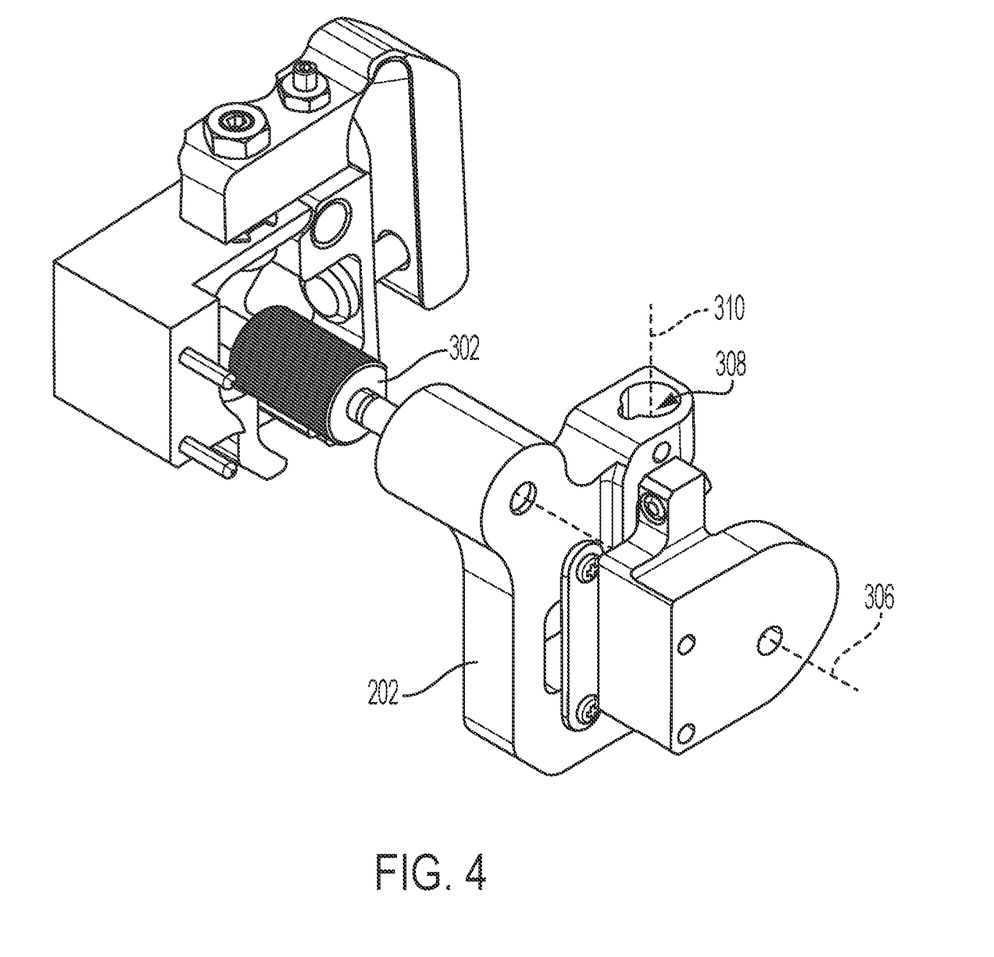
FIG. 4 is an exploded, perspective view of the tray table tuning mechanism of FIGS. 2A and 2B.
Figure 5A:
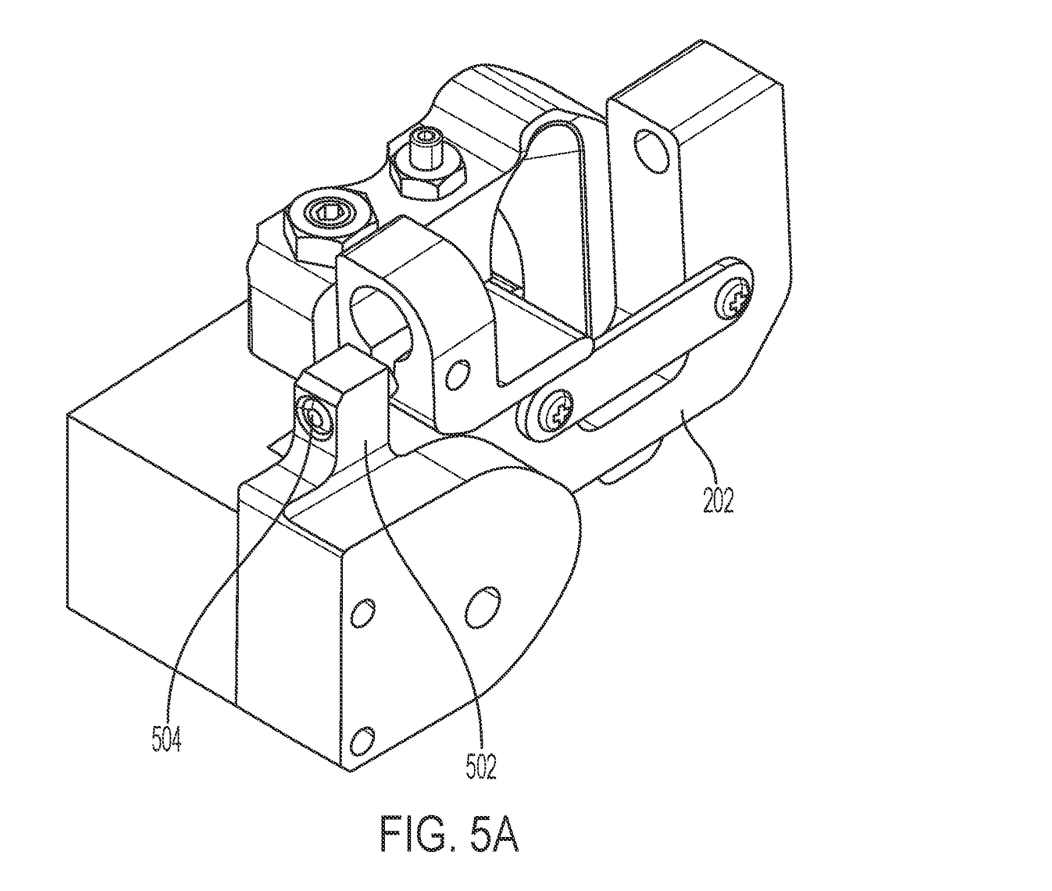
FIG. 5A is a perspective view of the tray table tuning mechanism of FIGS. 2A and 2B, with the paddle arm deployment member in the deployed state.
Figure 5B:
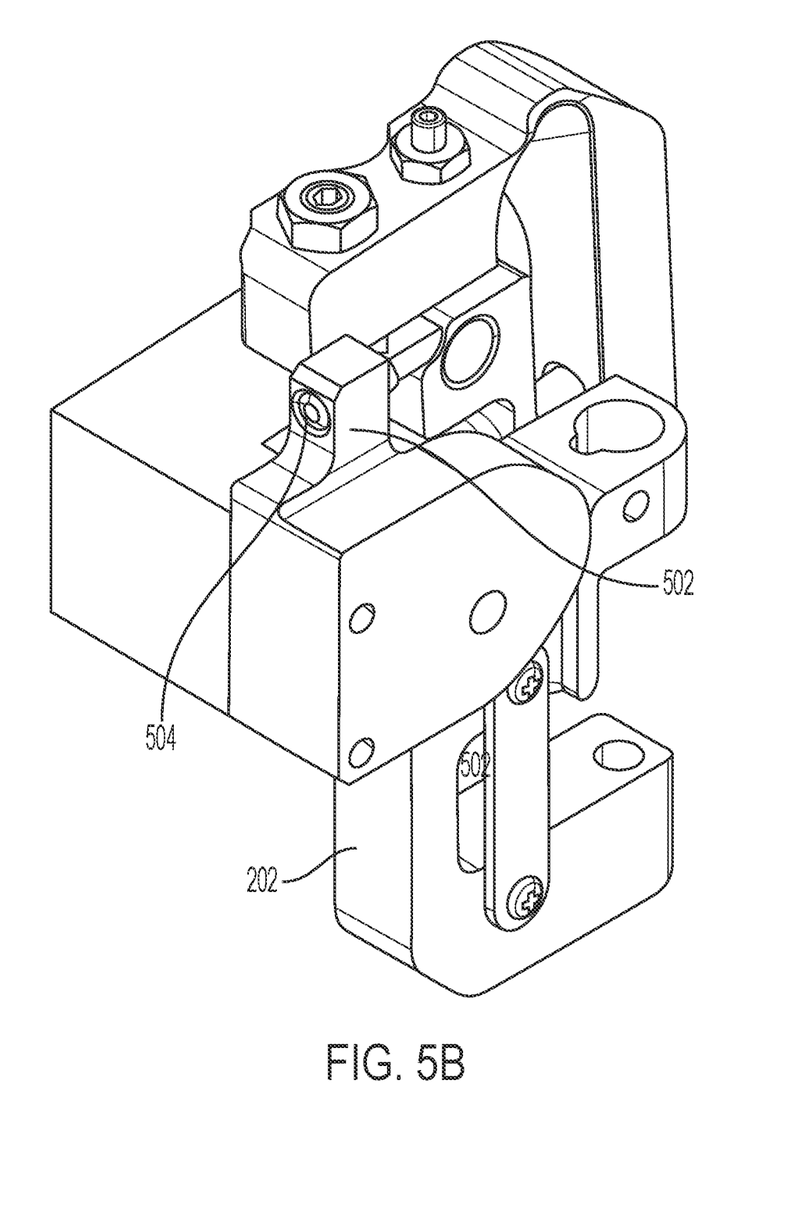
FIG. 5B is a perspective view of the tray table tuning mechanism of FIGS. 2A and 2B, with the paddle arm deployment member in the stowed state.
Figure 6:
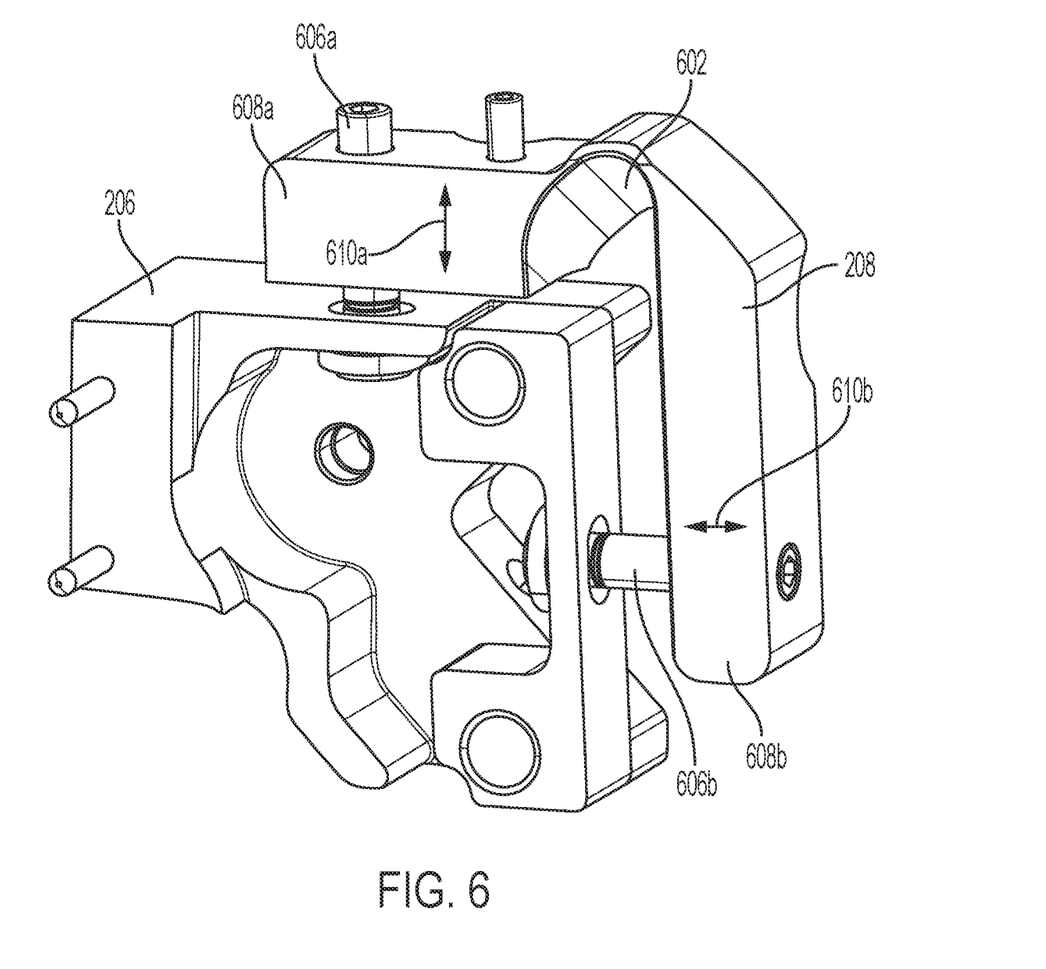
FIG. 6 is a perspective view of a portion of the mount member and the pivot limiting member of the tray table tuning mechanism of FIGS. 2A and 2B.

FIGS. 2A-3B illustrate a tray table tuning mechanism 106 according to various embodiments. FIGS. 4-6 illustrate partial and/or exploded views of elements of the tray table tuning mechanism according to various embodiments. In some embodiments, the tray table tuning mechanism 106 includes at least three components: the paddle arm 104, a paddle arm deployment member 202, at least one mount member 206, and a pivot limiting member 208. In further embodiments, the tray table tuning mechanism 106 may include additional or fewer elements or components as desired.

The elements or components of the tray table tuning mechanism 106 may be constructed from various suitable materials as desired, including but not limited to, stainless steel, aramid fibers, polycarbonate, polypropylene, aluminum, aluminum alloys, magnesium, magnesium alloys, other metallic materials or non-metallic materials, composite materials, combinations thereof, or other suitable materials. In certain embodiments, at least one element or component of the tray table tuning mechanism 106 may optionally be constructed from a material that is different from the material used for another element or component of the tray table tuning mechanism 106. For example, the paddle arm 104 may be constructed from a first material, and the pivot limiting member 208 may be constructed from a second material that may be different from the first material. In further embodiments, at least two of the elements or components of the tray table tuning mechanism 106 may be constructed from the same material.

Figure 2A:
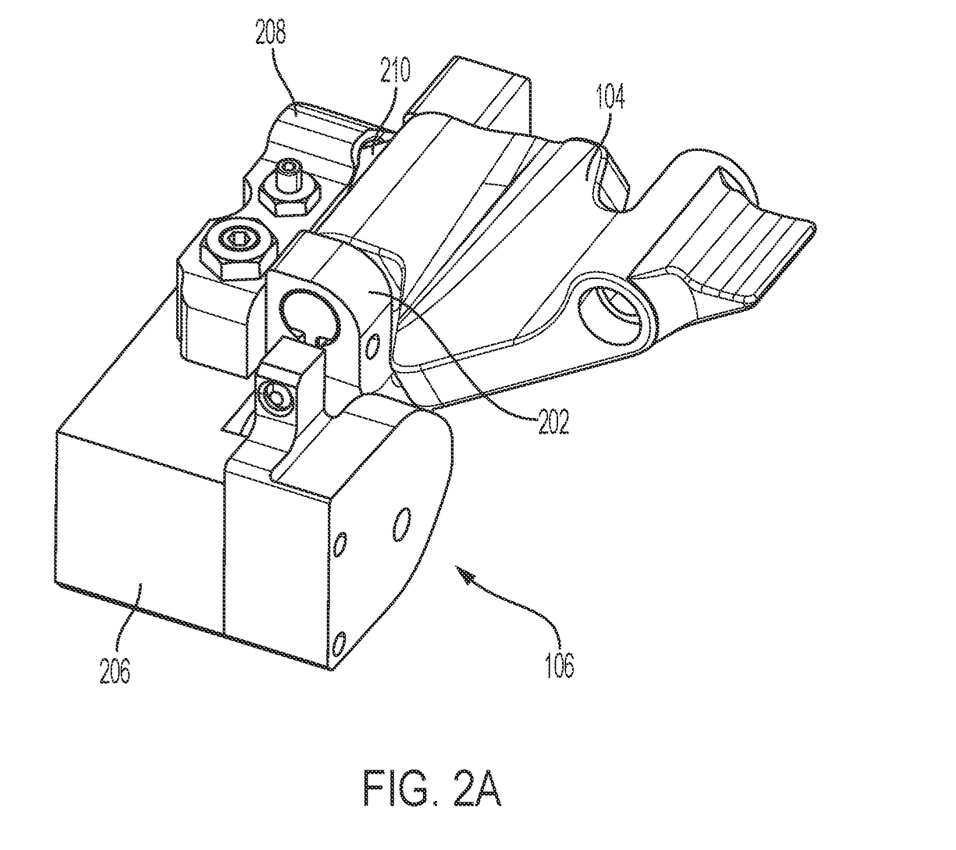
FIGS. 2A-2B are perspective views of a tray table tuning mechanism and paddle arm according to certain embodiments of the present invention.
Figure 2B:
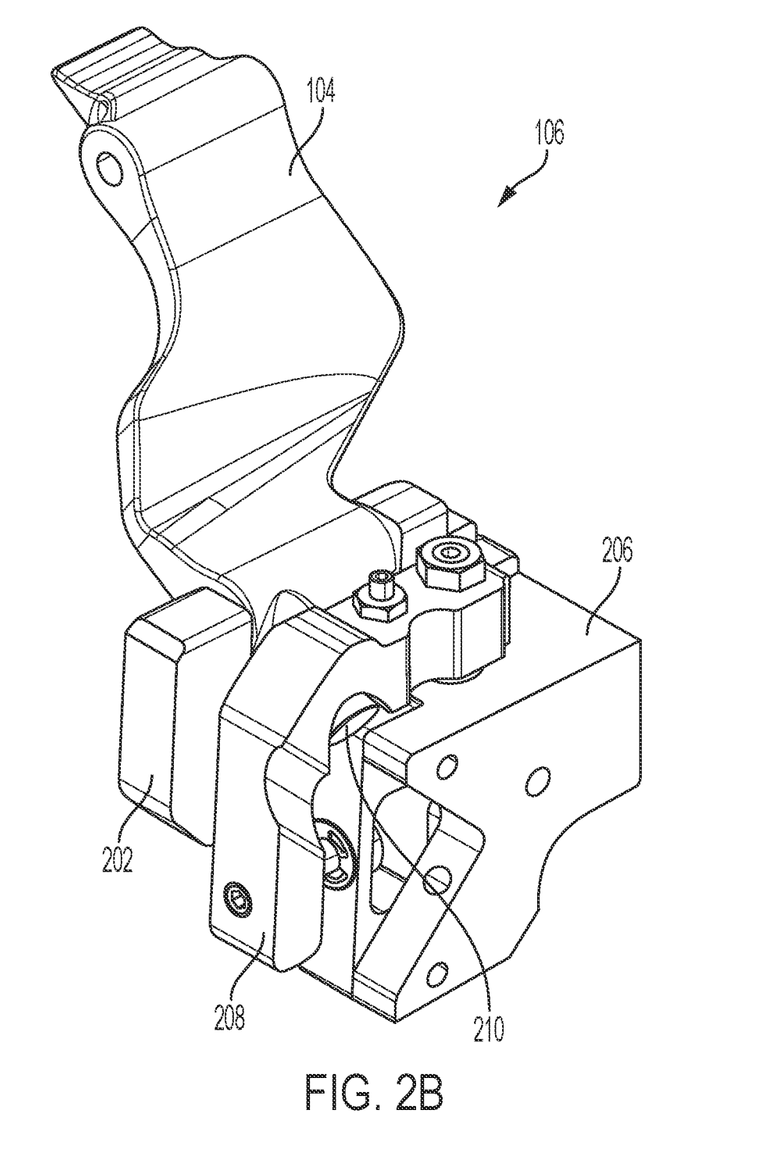
Figure 3A:
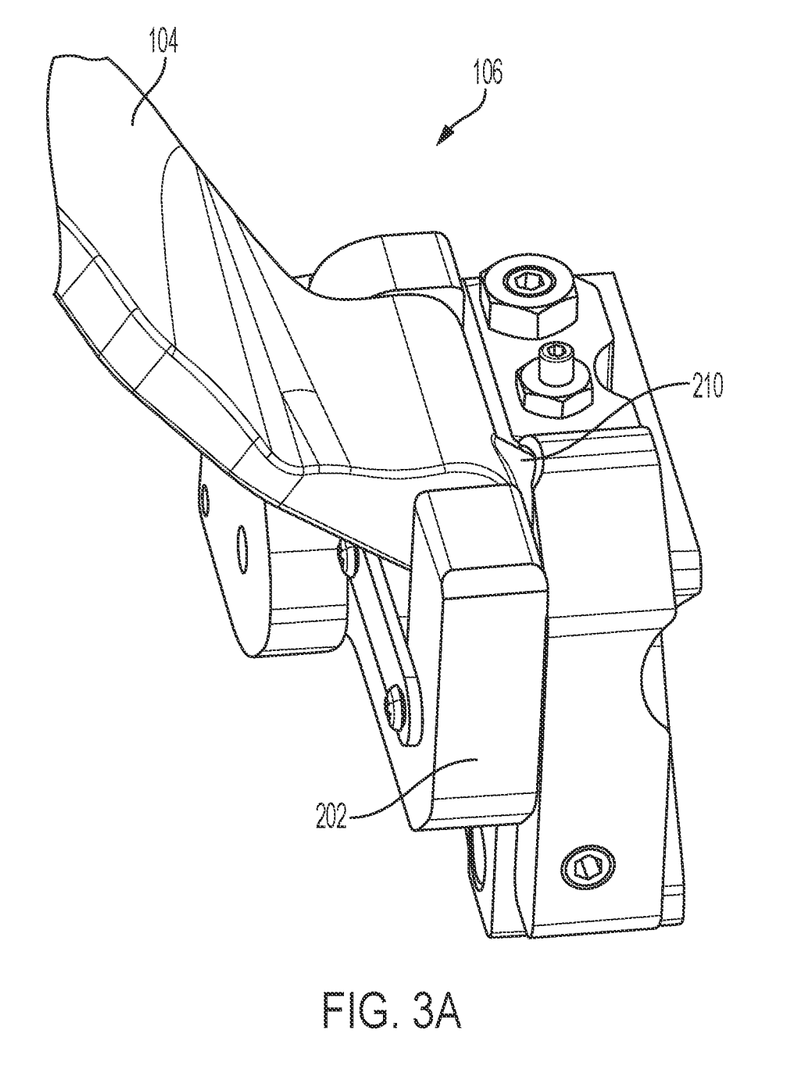
FIG. 3A is a perspective view of the tray table tuning mechanism and paddle arm of FIGS. 2A and 2B, with the paddle arm in the deployed state.
Figure 3B:
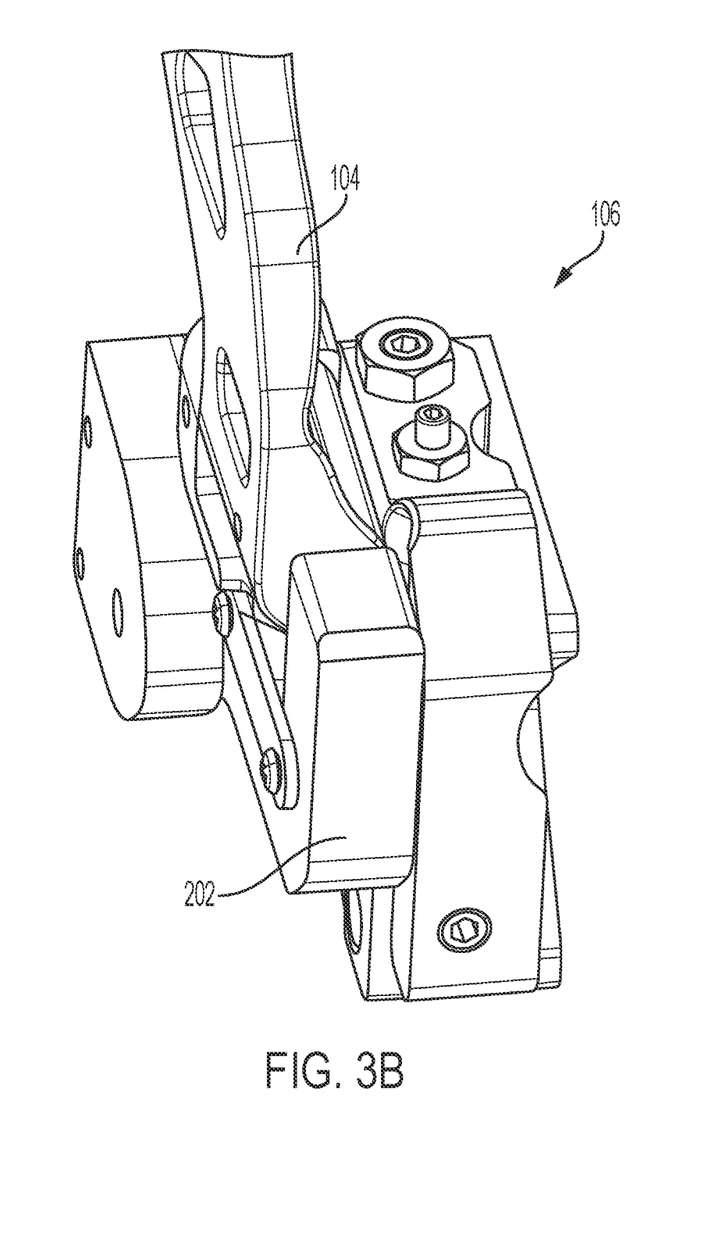
FIG. 3B is a perspective view of the tray table tuning mechanism and paddle arm of FIGS. 2A and 2B, with the paddle arm in the stowed state.

FIGS. 2A and 2B are perspective views of a tray table tuning mechanism 106 according to certain embodiments of the present invention. The tray table tuning mechanism 106 may include the paddle arm 104, the paddle arm deployment member 202, at least one mount member 206, and the pivot limiting member 208.

In some embodiments, the paddle arm deployment member 202 is pivotably coupled to the at least one mount member 206 so that the paddle arm deployment member 202 is pivotable relative to the at least one mount member 206. For example, the paddle arm deployment member 202 may be pivotably coupled to the at least one mount member 206 using a hinge extending at least partially through the at least one mount member 206 and the paddle arm deployment member 202, as described in more detail below in reference to FIG. 4. The at least one mount member 206 may be stationary or fixed relative to a passenger seat arm or other portion of a passenger seat.

The paddle arm 104 may be pivotably coupled to the paddle arm deployment member 202. In some embodiments, the paddle arm 104 may be pivoted between at least a stowed state and a deployed state. In the stowed state of the paddle arm 104, as illustrated at least in FIG. 3B, at least a portion of the paddle arm 104 is substantially parallel to the paddle arm deployment member 202 so that the paddle arm deployment member 202, and thus the paddle arm 104, the tray table 102, and other components of the table assembly 100 may be rotated to be positioned at least partially within a passenger seat arm or other suitable component of a passenger seat. In the deployed state, the tray table 102 may deployed and available for use, e.g., holding food.

As best illustrated at least in FIG. 4, the paddle arm deployment member 202 may include a first hinge 302 that may be positioned at least partially in the paddle arm deployment member 202 within a first opening of the paddle arm deployment member 202. A first axis 306 of the tray table tuning mechanism 106 may extend through a center of the first opening and the first hinge 302 when the first hinge 302 is positioned in the first opening. For example, the first hinge 302 may be positioned in the first opening along, or substantially parallel to, the first axis 306 of the tray table tuning mechanism 106. The paddle arm deployment member 202 may additionally include a second opening 308. A second axis 310 of the tray table tuning mechanism 106 may extend through a center of the second opening 308 and may be substantially perpendicular, or in some embodiments not parallel, to the first axis 306.

In some embodiments, the paddle arm deployment member 202, may be rotated about at least one axes. For example, the paddle arm deployment member 202, other suitable components of the tray table tuning mechanism 106, or a combination thereof may be pivoted or otherwise rotated about the first axis 306. As the paddle arm deployment member 202 rotates about the first axis 306, the tray table 102 moves with the paddle arm deployment member 202.

The tray table tuning mechanism 106 may include a second hinge that may be positioned to extend at least partially through the second opening 308 of the paddle arm deployment member 202 and at least partially through the paddle arm 104 to enable the paddle arm 104 to pivot relative to the paddle arm deployment member 202 and to rotate about the second axis 310. The second hinge may be positioned as described in the tray table tuning mechanism 106 using any suitable coupling device such as mechanical or chemical fasteners. In some embodiments, the second hinge may be a friction hinge that may, for example, be press-fit into the tray table tuning mechanism 106. The second hinge may be positioned in the tray table tuning mechanism 106 via other suitable techniques.

The paddle arm deployment member 202 may be pivoted between at least a stowed state, as best illustrated at least in FIG. 5B, and a deployed state, as best illustrated at least in FIG. 5A. In some embodiments, the paddle arm 104 reaches the deployed state after the paddle arm deployment member 202 is rotated about the first axis 306 to paddle arm deployment member deployed state and the paddle arm 104 is rotated about the second axis 310.

In some embodiments, the at least one mount member 206 includes a backstop portion 502 that may define a maximum deployed state of the paddle arm deployment member 202. In the maximum deployed state, as seen at least in FIG. 5A, a portion of the paddle arm deployment member 202 abuts a portion of the backstop portion 502 so that the backstop portion 502 prevents the paddle arm deployment member 202 from rotating past the maximum deployed state.

Additionally, the backstop portion 502 may include a pivot limiting device 504 that extends at least partially through the backstop portion 502 of the at least one mount member 206. In some embodiments, the pivot limiting device 504 is a screw. The pivot limiting device 504 may limit or otherwise adjust a maximum rotation of the paddle arm deployment member 202 to define a maximum deployed state of the paddle arm deployment member 202. For example, the pivot limiting device 504 may limit a maximum rotation of the paddle arm deployment member 202 due to a portion of the paddle arm deployment member 202 abutting a portion of the pivot limiting device 504. The maximum rotation of the paddle arm deployment member 202 may be adjusted by moving the pivot limiting device 504, e.g., turning the screw one direction or the other, to adjust a location of the pivot limiting device 504 relative to the backstop portion 502.

Referring back to FIGS. 3A and 3B, the paddle arm 104 may be rotated relative to the paddle arm deployment member 202 between the stowed state and the deployed state. The paddle arm 104 may include at least one stop member 210 that may be positioned such that when the paddle arm 104 is in the deployed state, the at least one stop member 210 contacts or abuts other surfaces with respect to the tray table tuning mechanism 106 to limit a maximum rotation of the paddle arm 104 in at least one direction. For example, the stop member 210 may abut a portion of the pivot limiting member 208 to limit the maximum rotation of the paddle arm 104, which, in some embodiments, may be a clockwise or a counterclockwise direction about the second axis 310. In the stowed state, the stop member 210 may be substantially parallel to the paddle arm deployment member 202.

As best illustrated at least in FIG. 6, at least a portion of the pivot limiting member 208 is substantially L-shaped. The pivot limiting member 208 comprises a mating surface 602 that defines a groove 604 sized to receive the stop member 210. For example, the groove 604 may be U-shaped or V-shaped, based on the shape of the stop member 210, and sized to correspond to the size of the stop member 210.

Further, the groove 604 is shaped so that the stop member 210 is forced farther into the groove 604, e.g., due to an angle of the groove 604. In some embodiments, the stop member 210 mates with the mating surface 602 so that a majority of a surface of the stop member 210 contacts the mating surface 602.

In some embodiments, the groove 604 defines the maximum rotation of the paddle arm 104 in the deployed state and the pivot limiting member 208 is engaged with and wedged into the groove 604. When the pivot limiting member 208 is engaged with the groove 604, the paddle arm deployment member 202 is prevented from rotating about the first axis 306 in either direction of rotation.

In some embodiments, the pivot limiting member 208 is coupled to at least a portion of the at least one mount member 206. A position of the pivot limiting member 208 relative to the mount member 206 may be adjustable. For example, a first screw 606a may couple a first portion 608a of the pivot limiting member 208 to the mount member 206, and a second screw 606b may couple a second portion 608b of the pivot limiting member 208 to the mount member 206. The first screw 606a and the second screw 606b may each extend through a respective slot in the mount member 206. Each slot may permit movement of the respective first screw 6061 and second screw 606b within the corresponding slot as the position of the pivot limiting member 208 is adjusted.

The first screw 606a may enable adjustment of the position of the pivot limiting member 208 relative to the mount member 206 in a first direction 610a. In some embodiments, the first direction 610a is the vertical direction. The second screw 606b may enable adjustment of the position of the pivot limiting member 208 relative to the mount member 206 in a second direction 610b. In some embodiments, the second direction 610b is the horizontal direction. Additionally, the first direction 610a may be perpendicular to the second direction 610b. The ability to adjust the position of the pivot limiting member 208, and ultimately the groove 604, relative to the mount member 206 enables a user to adjust and fine-tune the position and angle of the paddle arm 104 in the deployed state.

Each of the components of the tray table tuning mechanism 106 (e.g., the paddle arm 104, the paddle arm deployment member 202, at least one mount member 206, the pivot limiting member 208, etc.) may be formed via various manufacturing processes as desired. Suitable manufacturing processes include, but are not limited to, machining, forging, casting, printing, molding, combinations thereof, or other suitable processes as desired. In some embodiments, the manufacturing process used to form one component may be different from the manufacturing process used to form another component.

In the following, further examples are described to facilitate the understanding of the invention:

Example 1. A tray table tuning mechanism (which may incorporate features of any of the subsequent examples) comprising: a mount member; a pivot limiting member coupled to the mount member and comprising a mating surface defining a groove; a paddle arm deployment member pivotably coupled to the mount member and pivotable relative to the pivot limiting member; and a paddle arm pivotably coupled to the paddle arm deployment member, pivotable between a stowed state and a deployed state, and comprising at least one stop member; wherein, in the deployed state of the paddle arm, the at least one stop member is positioned within the groove and mates with the mating surface.

Example 2. The tray table tuning mechanism of example(s) 1 or any preceding or subsequent example(s), wherein a size and a shape of the groove corresponds to a size and a shape of the at least one stop member.

Example 3. The tray table tuning mechanism of example(s) 1 or any preceding or subsequent example(s), wherein a position of the pivot limiting member relative to the mount member is adjustable.

Example 4. The tray table tuning mechanism of example(s) 1 or any preceding or subsequent example(s), wherein a first screw couples a first portion of the pivot limiting member to the mount member, a second screw couples a second portion of the pivot limiting member to the mount member, and the position of the pivot limiting member is adjustable using at least one of the first screw or the second screw.

Example 5. The tray table tuning mechanism of example(s) 4 or any preceding or subsequent example(s), wherein the first screw adjusts a position of the pivot limiting member in a first direction, and the second screw adjusts a position of the pivot limiting member in a second direction.

Example 6. The tray table tuning mechanism of example(s) 1 or any preceding or subsequent example(s), wherein a maximum angle of rotation of the paddle arm is determined based on a shape of the groove.

Example 7. The tray table tuning mechanism of example(s) 1 or any preceding or subsequent example(s), wherein the groove is U-shaped or V-shaped.

Example 8. The tray table tuning mechanism of example(s) 1 or any preceding or subsequent example(s), wherein, in the deployed state of the paddle arm, the mating of the at least one stop member with the mating surface within the groove prevents a rotation of the paddle arm deployment member.

Example 9. A method (which may incorporate features of any of the preceding or subsequent examples) for using a tray table tuning mechanism comprising a mount member, a pivot limiting member comprising a mating surface defining a groove, a paddle arm deployment member, and a paddle arm, the method comprising: rotating the paddle arm deployment member relative to the mount member; and rotating the paddle arm relative to the paddle arm deployment member to a deployed state; wherein, in the deployed state, at least one stop member extending from the paddle arm is positioned within the groove and mates with the mating surface to limit rotation of the paddle arm deployment member in a first rotation direction.

Example 10. The method of example(s) 9 or any preceding or subsequent example(s), wherein, a size and a shape of the groove corresponds to a size and a shape of the at least one stop member.

Example 11. The method of example(s) 9 or any preceding or subsequent example(s), further comprising adjusting a position of the pivot limiting member relative to the mount member.

Example 12. The method of example(s) 11 or any preceding or subsequent example(s), wherein a first screw couples a first portion of the pivot limiting member to the mount member, a second screw couples a second portion of the pivot limiting member to the mount member, and the position of the pivot limiting member is adjustable using at least one of the first screw or the second screw.

Example 13. The method of example(s) 12 or any preceding or subsequent example(s), wherein the first screw adjusts a position of the pivot limiting member in a first translation direction, and the second screw adjusts a position of the pivot limiting member in a second translation direction.

Example 14. The method of example(s) 9 or any preceding or subsequent example(s), wherein a maximum angle of rotation of the paddle arm is determined based on a shape of the groove.

Example 15. The method of example(s) 9 or any preceding or subsequent example(s), wherein, in the deployed state of the paddle arm, the mating of the at least one stop member with the mating surface within the groove prevents a rotation of the paddle arm deployment member.

Example 16. A passenger seat (which may incorporate features of any of the preceding or subsequent examples) comprising: an arm rest; and a tray table tuning mechanism coupled to the arm rest, the tray table tuning mechanism comprising: a mount member; a pivot limiting member coupled to the mount member and comprising a mating surface defining a groove; a paddle arm deployment member pivotably coupled to the mount member and pivotable relative to the pivot limiting member; and a paddle arm pivotably coupled to the paddle arm deployment member, pivotable between a stowed state and a deployed state, and comprising at least one stop member; wherein, in the deployed state of the paddle arm, the at least one stop member is positioned within the groove and mates with the mating surface.

Example 17. The passenger seat of example(s) 16 or any preceding or subsequent example(s), wherein a size and a shape of the groove corresponds to a size and a shape of the at least one stop member.

Example 18. The passenger seat of example(s) 16 or any preceding or subsequent example(s), wherein: a first screw couples a first portion of the pivot limiting member to the mount member, and the first screw adjusts a position of the pivot limiting member in a first direction, and a second screw couples a second portion of the pivot limiting member to the mount member, and the second screw adjusts a position of the pivot limiting member in a second direction.

Example 19. The passenger seat of example(s) 16 or any preceding or subsequent example(s), wherein a maximum angle of rotation of the paddle arm is determined based on a shape of the groove.

Example 20. The passenger seat of example(s) 16 or any preceding example(s), wherein, in the deployed state of the paddle arm, the mating of the at least one stop member with the mating surface within the groove prevents a rotation of the paddle arm deployment member.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:
1. A tray table tuning mechanism comprising:
a mount member;
a pivot limiting member coupled to the mount member and comprising a mating surface defining a groove;

a paddle arm deployment member pivotably coupled to the mount member and pivotable relative to the pivot limiting member; and a paddle arm pivotably coupled to the paddle arm deployment member, pivotable between a stowed state and a deployed state, and comprising at least one stop member;

wherein, in the deployed state of the paddle arm, the at least one stop member is positioned within the groove and mates with the mating surface; and wherein a first screw couples a first portion of the pivot limiting member to the mount member, a second screw couples a second portion of the pivot limiting member to the mount member, and a position of the pivot limiting member is adjustable using at least one of the first screw or the second screw.

2. The tray table tuning mechanism of claim 1, wherein a size and a shape of the groove corresponds to a size and a shape of the at least one stop member.

3. The tray table tuning mechanism of claim 1, wherein a position of the pivot limiting member relative to the mount member is adjustable.

4. The tray table tuning mechanism of claim 1, wherein the first screw adjusts a position of the pivot limiting member in a first direction, and the second screw adjusts the position of the pivot limiting member in a second direction.

5. The tray table tuning mechanism of claim 1, wherein a maximum angle of rotation of the paddle arm is determined based on a shape of the groove.

6. The tray table tuning mechanism of claim 1, wherein the groove is U-shaped or V-shaped.

7. The tray table tuning mechanism of claim 1, wherein, in the deployed state of the paddle arm, the mating of the at least one stop member with the mating surface within the groove prevents a rotation of the paddle arm deployment member.

8. A method for using a tray table tuning mechanism comprising a mount member, a pivot limiting member comprising a mating surface defining a groove, a paddle arm deployment member, and a paddle arm, the method comprising:

rotating the paddle arm deployment member relative to the mount member; and rotating the paddle arm relative to the paddle arm deployment member to a deployed state;

wherein, in the deployed state, at least one stop member extending from the paddle arm is positioned within the groove and mates with the mating surface to limit rotation of the paddle arm deployment member in a first rotation direction; and wherein a first screw couples a first portion of the pivot limiting member to the mount member, a second screw couples a second portion of the pivot limiting member to the mount member, and a position of the pivot limiting member is adjustable using at least one of the first screw or the second screw.

9. The method of claim 8, wherein, a size and a shape of the groove corresponds to a size and a shape of the at least one stop member.

10. The method of claim 8, further comprising adjusting a position of the pivot limiting member relative to the mount member.

11. The method of claim 8, wherein the first screw adjusts a position of the pivot limiting member in a first translation direction, and the second screw adjusts the position of the pivot limiting member in a second translation direction.

12. The method of claim 8, wherein a maximum angle of rotation of the paddle arm is determined based on a shape of the groove.

13. The method of claim 8, wherein, in the deployed state of the paddle arm, the mating of the at least one stop member with the mating surface within the groove prevents a rotation of the paddle arm deployment member.

14. A passenger seat comprising:

an arm rest; and a tray table tuning mechanism coupled to the arm rest, the tray table tuning mechanism comprising:

a mount member;

a pivot limiting member coupled to the mount member and comprising a mating surface defining a groove;

a paddle arm deployment member pivotably coupled to the mount member and pivotable relative to the pivot limiting member; and a paddle arm pivotably coupled to the paddle arm deployment member, pivotable between a stowed state and a deployed state, and comprising at least one stop member;

wherein, in the deployed state of the paddle arm, the at least one stop member is positioned within the groove and mates with the mating surface;

wherein a first screw couples a first portion of the pivot limiting member to the mount member, and the first screw adjusts a position of the pivot limiting member in a first direction; and a second screw couples a second portion of the pivot limiting member to the mount member, and the second screw adjusts the position of the pivot limiting member in a second direction.

15. The passenger seat of claim 14, wherein a size and a shape of the groove corresponds to a size and a shape of the at least one stop member.

16. The passenger seat of claim 14, wherein a maximum angle of rotation of the paddle arm is determined based on a shape of the groove.

17. The passenger seat of claim 14, wherein, in the deployed state of the paddle arm, the mating of the at least one stop member with the mating surface within the groove prevents a rotation of the paddle arm deployment member.

* * * * *